US012248903B2

(12) United States Patent
Kunjukrishnan

(10) Patent No.: US 12,248,903 B2
(45) Date of Patent: Mar. 11, 2025

(54) PORTABLE DRONE DELIVERY PAD

(71) Applicant: T-MOBILE INNOVATIONS LLC, Overland Park, KS (US)

(72) Inventor: Syam Sarasamma Kunjukrishnan, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/884,841

(22) Filed: Aug. 10, 2022

(65) Prior Publication Data

US 2024/0054438 A1   Feb. 15, 2024

(51) Int. Cl.
| G06Q 10/0833 | (2023.01) |
| B64C 39/02 | (2023.01) |
| B64U 101/60 | (2023.01) |
| G07C 5/00 | (2006.01) |

(52) U.S. Cl.
CPC ....... *G06Q 10/0833* (2013.01); *B64C 39/024* (2013.01); *G07C 5/008* (2013.01); *B64U 2101/60* (2023.01); *B64U 2201/10* (2023.01)

(58) Field of Classification Search
CPC .............................. G06Q 10/08; G06Q 10/083
USPC ........................................................ 705/333
See application file for complete search history.

(56) References Cited

U.S. PATENT DOCUMENTS

| 10,049,589 | B1 * | 8/2018 | Boyd ..................... B64D 47/08 |
| 10,395,544 | B1 * | 8/2019 | Harris .................. G08G 5/0069 |
| 10,874,240 | B2 * | 12/2020 | Lewis ................... A47G 29/141 |
| 11,081,013 | B1 * | 8/2021 | Harris ....................... B64D 1/02 |
| 11,912,438 | B2 * | 2/2024 | Wankewycz ........... B64D 27/24 |
| 2016/0068264 | A1 * | 3/2016 | Ganesh ............. G06Q 30/0641 |
|  |  |  | 701/4 |
| 2017/0011333 | A1 * | 1/2017 | Greiner .................. B64D 47/08 |
| 2017/0283057 | A1 * | 10/2017 | Thompson ............ B64C 39/024 |
| 2018/0290764 | A1 * | 10/2018 | McMillian ........... G08G 5/0026 |
| 2018/0357910 | A1 * | 12/2018 | Hobbs .................. G05D 1/0676 |
| 2021/0056494 | A1 * | 2/2021 | Denn Yangourazov ..................... |
|  |  |  | G07F 11/16 |

FOREIGN PATENT DOCUMENTS

KR   102539004 B1 *   6/2023

OTHER PUBLICATIONS

"An Onboard Vision-Based System for Autonomous Landing of a Low-Cost Quadrotor on a Novel Landing Pad," by Longbin Liu, Jiayi Tian, Xuancen Liu, Oct. 29, 2019 (Year: 2019).*

* cited by examiner

*Primary Examiner* — Jeff Zimmerman
*Assistant Examiner* — Brian Adams Heflin
(74) *Attorney, Agent, or Firm* — SHOOK, HARDY & BACON L.L.P.; Elena K. McFarland

(57) ABSTRACT

Systems, methods, and computer-readable media are provided for using a mobile drone delivery device. The mobile drone delivery device determines a general location thereof to be provided to a drone. The drone then uses that general location to approach a vicinity of the mobile drone delivery device. Each of the drone and the mobile drone delivery device then communicates with each other to determine a precise location such that the drone may land on the mobile drone delivery device.

20 Claims, 5 Drawing Sheets

PORTABLE DRONE DELIVERY PAD

SUMMARY

A high-level overview of various aspects of the present disclosure is provided here to introduce a selection of concepts further described below in the detailed description. This summary is neither intended to identify key features or essential features of the claimed subject matter, nor intended to be used as an aid in isolation to determine the scope of the claimed subject matter.

In brief and at a high level, the present disclosure describes, among other things, systems, methods, and computer-readable media that employ a unique method of providing a mobile drone pad which utilizes a series of location methods to pinpoint a position of a landing pad for a drone. This is all done by way of a wireless network which facilitates delivery of a package to the landing pad.

BRIEF DESCRIPTION OF THE DRAWINGS

Illustrative embodiments of the present disclosure are described in detail below with reference to the attached drawing, wherein.

DETAILED DESCRIPTION

Figure 1:
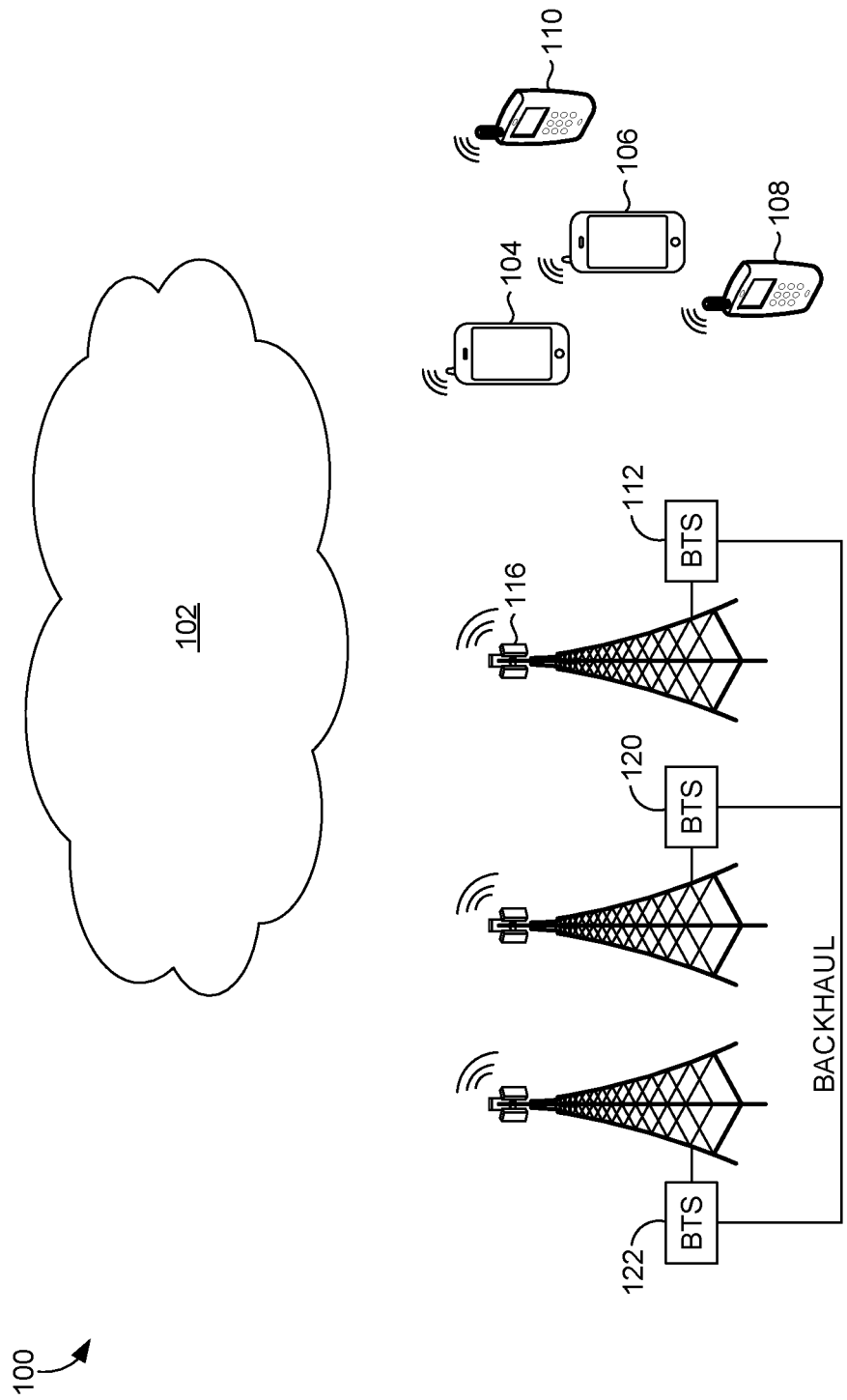
FIG. 1 depicts an exemplary network environment, in accordance with an aspect of the present disclosure.

The subject matter of selective embodiments of the present disclosure are described with specificity herein to meet statutory requirements. The detailed description is not intended to define what is regarded as the invention nor intended to limit the scope of the claimed subject matter. The claimed subject matter might be embodied in other ways to include different steps or combinations of steps similar to those described herein, in conjunction with other present or future technologies. Terms recited herein should not be interpreted to imply any particular order among or between various steps described herein unless and except when an order of individual steps is explicitly described.

Throughout the detailed description of the present disclosure, several acronyms and shorthand notations are used to aid the understanding of certain concepts pertaining to an associated system and services. These acronyms and shorthand notations are solely intended for the purpose of providing an easy methodology of communicating the ideas expressed herein and are in no way meant to limit the scope of the present disclosure. The following is a list of these acronyms:

| | |
|---|---|
| AWS | Advanced Wireless Services |
| BRS | Broadband Radio Service |
| BTS | Base Transceiver Station |
| CDMA | Code Division Multiple Access |
| EBS | Educational Broadband Services |
| eNodeB | Evolved Node B |

-continued

| | |
|---|---|
| EVDO | Evolution-Data Optimized |
| gNodeB | Next Generation Node B |
| GPS | Global Positioning System |
| GSM | Global System for Mobile Communications |
| HRPD | High Rate Packet Data |
| eHRPD | Enhanced High Rate Packet Data |
| LTE | Long Term Evolution |
| LTE-A | Long Term Evolution Advanced |
| PCS | Broadband Personal Communications Service |
| RNC | Radio Network Controller |
| SyncE | Synchronous Ethernet |
| TDM | Time-Division Multiplexing |
| VOIP | Voice Over Internet Protocol |
| WAN | Wide Area Network |
| WCS | Wireless Communications Service |
| WiMAX | Worldwide Interoperability for Microwave Access |

Further, various technical terms are used throughout the detailed description. Definitions of such terms can be found in, for example, Newton's Telecom Dictionary by H. Newton, 32nd Edition (2022). These definitions are intended to provide a clear understanding of the ideas disclosed herein but are not intended to limit the scope of the present disclosure. The definitions and the terms should be interpreted broadly and liberally to an extent allowed by the meaning of the words offered in the above-cited reference.

Embodiments of the technology described herein may be implemented as, among other things, a method, a system, or a computer-program product. Accordingly, the embodiments may include a hardware embodiment, or an embodiment combining a software and a hardware. In one embodiment, the present disclosure includes the computer-program product that includes computer-useable instructions embodied on one or more computer-readable media.

The computer-readable media includes volatile and/or nonvolatile media, removable and non-removable media, and contemplates media readable by a database, a switch, and various other network devices. Network switches, routers, and related components are conventional in nature, as are the means of communicating with the same. By way of non-limiting example, the computer-readable media includes computer storage media and/or communications media. The computer storage media, or machine-readable media, includes media implemented in any method or technology for storing information. Examples of stored information includes computer-useable instructions, data structures, program modules, and other data representations. The computer storage media includes, but is not limited to, random-access memory (RAM), read-only memory (ROM), electronically erasable programmable read-only memory (EEPROM), flash memory or other memory technology, compact disc read-only memory (CD-ROM), digital versatile discs (DVDs), holographic media or other optical disc storage, magnetic cassettes, magnetic tape, magnetic disc storage, and/or other magnetic storage devices. These memory components may store data momentarily, temporarily, or permanently. The computer storage media does not encompass a transitory signal in embodiments of the present disclosure. The computer storage media does not comprise a propagated data signal.

The communications media typically stores computer-useable instructions, including data structures and program modules, in form of a modulated data signal. The term "modulated data signal" refers to a propagated signal that has one or more of its characteristics set or changed to encode information associated therewith. The communications media includes any information-delivery media. By way of non-limiting example, the communications media includes wired media, such as a wired network or a direct-wired connection; and wireless media, such as acoustic, infrared, radio, microwave, spread-spectrum, and other wireless media technologies. Combinations of the above are included within the scope of the computer-readable media.

It should be understood that any user equipment (UE) discussed herein is in general form of equipment and machines, such as, but not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, or any other smart device that, at least in part, is operated based on micro-service data received via a network. That said, in some embodiments, the UE may also include handheld personal computing devices, such as cellular phones, tablets, and similar consumer equipment, or stationary desktop computing devices, workstations, servers and/or network infrastructure equipment. As such, the UE may include both mobile UE and stationary UE configured to request micro-service data from the network.

At a high level, systems, methods, and the computer-readable media described herein provides for the use and facilitation of delivery of a package using a mobile drone delivery pad. Currently, there is nothing which provides for a drone delivery pad which allows for a drone to deliver a package to a location which has not been pre-specified. Few conventional drone landing pads may allow the drone to depart from and return to the drone landing pad. Other known drone landing pads may allow the drone to land but require the drone landing pad to have an exact location of the drone landing pad provided to the drone. This adds to the complications in situations where elevation is an issue or that the drone landing pad must be moved around. For example, a user must enter an exact location but may be on a fifth floor of a high-rise building and the drone may not be able to determine or identify that the landing pad is on the fifth floor of the location.

According to a first aspect of the present disclosure, a method for using a drone delivery device is provided. The method includes establishing a wireless communication between a mobile drone delivery device and a wireless communications network operating on a base station. The method further includes sending from the mobile drone delivery device, by way of the wireless communications network, an initial location of the mobile drone delivery device in relation to the cell site and a request to deliver a package at a specified delivery location. The method includes receiving from a drone, by way of the wireless communications network, a request to wirelessly communicate with the mobile drone delivery device. The method also includes sending, by way of the wireless communications network, the general location of the mobile drone delivery device to the drone. The method provides for establishing a wireless communication between the drone and the mobile drone delivery device and sending to the drone, a calculated relative location of the drone relative to the mobile drone delivery device. Additionally, the method includes sending, by way of the wireless communications network, an indication that the drone has deposited a first package at a specified delivery location.

According to a second aspect of the present disclosure, computer-readable media is provided. The computer-readable media includes computer-executable instructions embodied thereon that, when executed, perform a method. The method includes establishing a wireless communication between a mobile drone delivery device and a wireless communications network. The method further includes receiving from the mobile drone delivery device, by way of the wireless communications network, an initial location of the mobile drone delivery device along with a unique device identifier and a request to deliver a package at a specified delivery location. The method includes receiving from a drone, by way of the wireless communications network, a request to wirelessly communicate with the mobile drone delivery device; wherein a wireless communication is established between the drone and the mobile drone delivery device and a calculated relative location (distance, and horizontal and vertical direction) of the drone relative to the mobile drone delivery device is communicated by way of the wireless communication from the drone to the mobile drone delivery device. The method also includes receiving, by way of the wireless communications network, an indication that the drone has deposited a first package at a specified delivery location.

According to a third aspect of the present disclosure, a system is provided. The system includes one or more processors configured to perform a computer implemented method. The computer implemented method includes establishing a wireless communication between a mobile drone delivery device and a wireless communications network. The computer implemented method further includes receiving from the mobile drone delivery device, by way of the wireless communications network, an initial location of the mobile drone delivery device along with a unique device identifier and a request to deliver a package at a specified delivery location. The method includes receiving from a drone, by way of the wireless communications network, a request to wirelessly communicate with the mobile drone delivery device; wherein a wireless communication is established between the drone and the mobile drone delivery device and a calculated relative location of the drone relative to the mobile drone delivery device is communicated by way of the wireless communication from the drone to the mobile drone delivery device. The method also includes receiving, by way of the wireless communications network, an indication that the drone has deposited a first package at a specified delivery location.

Referring to FIG. 1, an example of a network environment 100 suitable for use in implementing embodiments of the present disclosure is illustrated. The network environment 100 is illustrated as an example of a suitable network environment and is not intended to suggest any limitation to the scope of use or functionality of the present disclosure. Neither should the network environment 100 be interpreted as having any dependency or requirement relating to any one or combination of components illustrated in FIG. 1.

The network environment 100 includes a network 102 that provides service to current user equipment (UE) 104, Internet of Things (IoT) device 106, and one or more legacy UE 108 and 110. The network 102 may be accessible through a base transceiver station 112 that is connected to a backhaul server (not shown). The base transceiver station 112 and/or a computing device (for example, a local device or a remote device) associated with the base transceiver station 112 may manage or otherwise control operation of components of a cell site, including an antenna array 116. The base transceiver station 112 and/or the computing device associated with the base transceiver station 112 may include one or more processors and computer-readable storage media having computer-executable instructions or computer instruction modules embodied thereon for execution by the one or more processors.

The antenna array 116 may radiate in a particular direction and, thus, may correspond to a particular sector of the cell site. In some embodiments, the antenna array 116 may have a plurality of antenna elements. In one embodiment, the antenna array 116 is configured to have a plurality of elements that in number, arrangement, and/or density, are configured for massive Multiple-in Multiple-out (mMIMO) configuration. In one embodiment, the base transceiver station 112 may include a radio and/or a controller, such as a massive Multiple-Input Multiple-Output (mMIMO) Unit for controlling a mMIMO configured antenna array, such as the antenna array 116 having the plurality of antenna elements. The base transceiver station 112 may use the controller to monitor one or more of throughput, signal quality metrics (for example, signal-to-interference-plus-noise ratio (SINR)), number of unique users/subscribers, number of unique UE(s), and/or remote location filings (RLFs) that occur at the base transceiver station 112, all of which may be monitored dynamically and/or stored in a data store. The antenna array 116 may also be configured to operate under a lower order number of antenna elements than an antenna array configured to operate under the mMIMO configuration. Such a lower order configuration may be a legacy system, such as an eight branch transmit and eight branch receive (8T8R) antenna structure.

The base transceiver station 112 may use a radio (such as the radio 524 shown in FIG. 5) that is connected to the antenna array 116 by a physical radio-frequency (RF) path, where the radio is used to cause the antenna array 116 to transmit radio-frequency signals using the plurality of antenna elements. The plurality of antenna elements in the antenna array 116 may include portions of antenna elements (not shown). In some embodiments, the plurality of antenna elements of the antenna array 116 may be partitioned such that a first portion of antenna elements may be associated with, dedicated to, correspond to, and/or be configured to operate using a first access technology, and a second portion of antenna elements may be associated with, dedicated to, correspond to, and/or be configured to operate using a second access technology. In one embodiment, the plurality of antenna elements may be partitioned into unequal groups or, alternatively, "split" into equal halves, wherein each group or half operates to provide a coverage area for a distinct access technology when the antenna array 116 operates in a dual technology mode.

In some embodiments, the antenna array 116 is partitioned such that the first portion of antenna elements is associated with the first access technology and the second portion of antenna elements is associated with the second access technology. In some embodiments, when the antenna array 116 is operating in the dual technology mode, each portion of the plurality of antenna elements may operate using only one distinct protocol and/or an access technology relative to the other portions in the antenna array 116. In one example, the first portion of antenna elements may operate using 5G wireless access technology and the second portion of antenna elements may operate using 4G wireless access technology. Additionally, it will be understood that the terms "first" and "second" are used herein for the purpose of clarity in distinguishing portions of antenna elements from one another, but the terms are not used herein to limit the sequence, relevance, number of portions, technological functions, and/or operations of each portion unless specifically and explicitly stated.

As such, the base transceiver station 112 may provide the current UE 104, the IoT device 106 and the legacy UE 108 and 110 with access to the network 102. In some embodiments, the first portion of antenna elements may communicate with the current UE 104 and the IoT device 106 using the 5G wireless access technology, and the second portion of the antenna elements may communicate with the legacy UE 108 and 110 using the 4G wireless access technology. When operating in the dual technology mode, the antenna array 116 may concurrently connect to and communicate with the current UE 104, the IoT device 106, and the legacy UE 108 and 110 using, respectively, at least two distinct access technologies. Additionally, the first portion of the antenna elements may communicate with the IoT device 106 using 4G wireless access technology or any other wireless technology.

Accordingly, in one example, when the antenna array 116 is operating in the dual technology mode, the base transceiver station 112 concurrently acts an eNodeB (or "eNB") and gNodeB (or "gNB"). As such, the base transceiver station 112 may provide service to one or more access technologies to both the current UE 104, the IoT device 106 and the legacy UE 108, 110. In addition to communicating with the current UE 104, the IoT device 106, and the legacy UE 108 and 110, the base transceiver station 112 may also communicate with one or more neighboring base transceiver stations. In some embodiments, the base transceiver station 112 may communicate with one neighboring base transceiver station 120 using the first access technology and may communicate with another neighboring base transceiver station 122 using the second access technology. For example, since the base transceiver station 112 may operate concurrently as the eNodeB and the gNodeB using the antenna array 116 that is partitioned and operating in the dual technology mode, the base transceiver station 112 may communicate with other base transceiver stations, such as the neighboring base transceiver stations 120 and 122. For example, the base transceiver station 112 communication may include legacy base transceiver stations that cannot use current access technologies (for example 5G) or current base transceiver stations that lack backward compatibility with prior access technologies (for example 4G). In some embodiments, the base transceiver station 112 may bi-directionally exchange information with the neighboring base transceiver stations 120 and 122 through an X2 interface or X2 link. Information regarding signal quality, RF conditions, one or more RLFs, and SINR levels at each of the neighboring base transceiver stations 120 and 122, and/or as reported from the current UE 104 or legacy UE 108, 110 to the neighboring base transceiver stations 120 and 122, may be communicated to the base transceiver station 112 via the X2 link. Additionally, or alternatively, information regarding the signal quality, the RLFs, and the SINR levels at each of the neighboring base transceiver stations 120 and 122 may be communicated to the base transceiver station 112 over a backhaul.

As mentioned, the base transceiver station 112 may include the radio and/or the controller, such as a memory management unit (MMU) that enables the base transceiver station 112 to adjust or modify the operations and transmissions of the plurality of antenna elements in the antenna array 116. In some embodiments, operations, configurations, and/or settings of each antenna element may be individually controlled and adjusted by the base transceiver station 112 using the controller. In some embodiments, the operations, configurations, and/or settings of the first portion of antenna elements may be controlled and adjusted as a group by the base transceiver station 112 using the controller, such as the MMU, independent of the second portion of antenna elements. In a similar fashion, the operations, the configurations, and/or the settings of the second portion of antenna elements may be controlled and adjusted as a group by the base transceiver station 112 using the controller, independent of the first portion of antenna elements. Accordingly, the base transceiver station 112 may use the controller to independently adjust different groups or portions of the antenna elements within one antenna array, such as the antenna array 116.

In some embodiments, the operations, the configurations, and/or the settings of each individual antenna element may be adjusted and customized. For example, the base transceiver station 112 instructs a portion of the antenna elements to transmit one or more synchronization signals using a periodicity. In another example, the portion of the antenna elements may transmit a plurality of synchronization signals using the periodicity, as instructed by the base transceiver station 112. In some embodiments, the synchronization signals may be specific to and/or configured for the first access technology.

Accordingly, the base transceiver station 112 may use the controller to independently adjust different individual antenna elements, any number of groupings and/or subset(s) of each portion of the antenna elements, and/or portions of the antenna elements within one antenna array, such as the antenna array 116. In some embodiments, the base transceiver station 112 may use the controller to measure and monitor one or more of throughput, signal quality metrics (for example, SINR), number of unique users/subscribers, number of unique UE, and/or RLFs.

Figure 2:
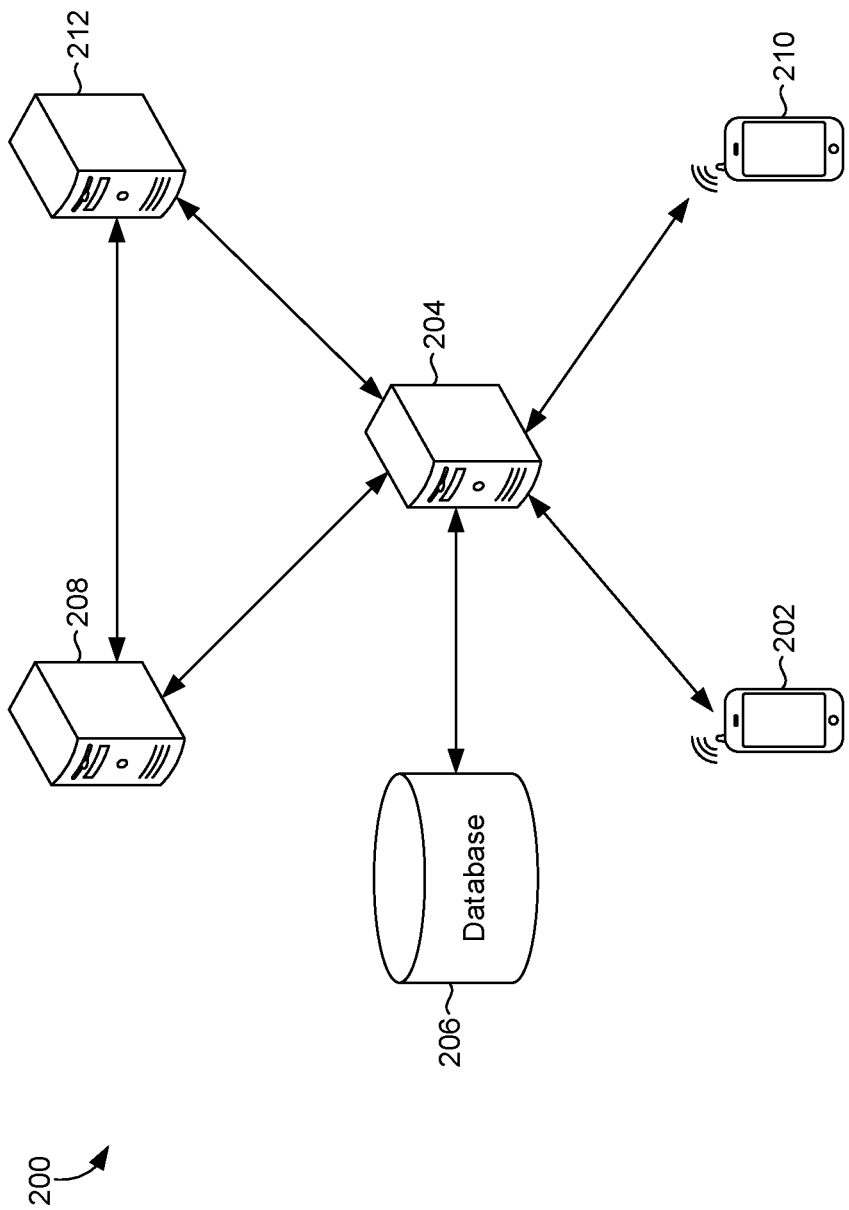
FIG. 2 depicts an exemplary network environment, in accordance with an aspect of the present disclosure.

Referring to FIG. 2, an exemplary network environment 200 is illustrated in which implementations of the present disclosure may be employed. The network environment 200 is one example of a suitable network environment and is not intended to suggest any limitation as to the scope of use or functionality of the present disclosure. Neither should the network environment 200 be interpreted as having any dependency or requirement relating to any one or combination of components illustrated.

The network environment 200 represents a high level and simplified view of relevant portions of a modern wireless telecommunication network. At a high level, the network environment 200 may generally include one or more Ues, such as a first UE 202 and a second UE 210, a network 204, a database 206, one or more user device accounts, such as a first UE account 208 and a second UE account 212, though in some implementations it may not be necessary for certain features to be present. The network environment 200 is generally configured for wirelessly connecting the first UE 202 with other Ues and with other telecommunication networks, such as a publicly-switched telecommunication network (PSTN), or data or services that may be accessible on one or more application servers or other functions, nodes, or servers not illustrated in FIG. 2, so as to not obscure the focus of the present disclosure. As illustrated generally, the first UE 202 may be implemented as, for example, a tablet, a phone, or a wearable device, or any other device discussed with respect to FIG. 1.

The first UE 202 is generally configured to transmit and receive one or more signals to and from a base transceiver station (such as the base transceiver station 112 in FIG. 1) associated with the network 204. Communication protocols associated with the network 204 are configured to receive one or more signals from the first UE 202, and the one or more signals may be implemented as uplink signals. In response to receiving certain requests from the first UE 202, the communication protocol may communicate with the network 204. For example, in order for the first UE 202 to connect to a desired network service (for example, PSTN call, voice over LTE (VoLTE) call, voice over new radio (VoNR), data, or the like), the first UE 202 may communicate an attach request to the communication protocol, which, in response, may communicate a registration request to the network 204. The communication protocol may take the form of a home network (for example, a protocol belonging to or affiliated with a carrier associated with the first UE 202) or a visiting/roaming network (for example, a protocol belonging to or operated by an entity other than the carrier associated with the first UE 202, but which, in certain conditions, may provide extended wireless access to the first UE 202 beyond a reach of the home network).

In one aspect, the first UE 202 may be a mobile drone landing pad which may include various computer components, processors, and/or memories that facilitate various operations of landing of an aerial drone and may also include communication components that facilitate communication and coordination of the first UE 202 and the second UE 210. The mobile drone landing pad may include internal batteries or power sources. The mobile drone landing pad may also include an external power source, such as a solar charging system or external plug.

The mobile drone landing pad may include portions which are able to determine a geo-location thereof. Such portions of the mobile drone landing pad may include a GPS locator, or any other geo-location device located on or near the mobile drone landing pad. The mobile drone landing pad may also comprise a wireless communications capabilities or even leverage a wireless communication device, such as a mobile phone or tablet. Further, the mobile drone landing pad or the first UE 202 may include security functions which may be able to detect unauthorized movement or tampering with the mobile drone landing pad. Such security functions may include a gyroscope or movement detecting functions and sensors that indicate to the first UE account 208 that the mobile drone landing pad has been moved. The first UE account 208 may then determine if the movement is authorized based on instructions provided as to where the mobile drone landing pad is required to be or if the movement is unauthorized. The mobile drone landing pad may also be able to trigger and appropriate notification based on the type of movement/activity detected.

The first UE 202 may also include a location determiner that uses GPS sensors on the first UE 202, or another method of location determination, to determine the location of the first UE 202 or a delivery location. For example, based on GPS data, or other location determination information, received from the first UE 202, a location determiner will determine an address of a location of the first UE 202 or the mobile drone landing pad and a general location within the delivery location that the second UE 210 may generally approach prior to determining an exact location of the first UE 202 with respect to the second UE 210 using relative location calculation methods.

In another aspect, the first UE 202 may include a mobile landing pad or a mobile drone delivery pad, both of which may be used interchangeably. The mobile landing pad may include a robotic mechanism such that the mobile landing pad may be able to move from a first location to a second location on its own power. Such robotic mechanism may include wheels or tracks, motors, batteries, power sources, computer functionalities, and hardware which allow the mobile landing pad to move. The robotic mechanism may also include aerial functions which allow the mobile landing pad to move through the air from a first location to a second location. Such aerial functions may include a drone propulsion system that allows the aerial drone or mobile landing pad to move to different locations. Such movement may be guided autonomously or with some degree of human input. In one example, the drone propulsion system includes four motors, each having a respective propeller that provides lift to the aerial drone when in operation. It is contemplated that many other configurations of a drone or drones may be used in different embodiments to guide or track shifting of one or multiple objects. Additionally, the robotic mechanism may include steering functions and location determining functions. The steering functions may include wheel turning or skid turning mechanisms.

In yet another aspect, the mobile landing pad is operated using human intervention, such as a remote control or other steering device. In a further aspect, the mobile landing pad is operated autonomously. The autonomous movement of the mobile landing pad may be such that the first UE account 208 may communicate that the mobile landing pad must move from the first location or current location to the second location. The mobile landing pad may then determine the current location thereof and autonomously move from the current location to the second location or a delivery location.

An exemplary drone may further include a drone propulsion system that allows the aerial drone to move to different locations. This movement may be guided autonomously or with some degree of human input. In one example, the drone propulsion system includes four motors each having a respective propeller that provides lift to the aerial drone when in operation. It is contemplated that many other configurations of a drone or drones may be used in different embodiments to guide or track the shifting of one or multiple objects. The second UE 210 may also be any other form of autonomous or semi-autonomous vehicle which may move and or be operated to deliver a package to a destination such as the location of the first UE 202.

The network 204 may be a part of a telecommunication network that connects subscribers to their service provider. In some aspects, the service provider may be a telecommunications service provider, an internet service provider, or any other similar service provider that provides at least one of voice telecommunications and/or data services to the first UE 202 and any other Ues. For example, the network 204 may be associated with a telecommunications provider that provides services (for example, LTE) to the first UE 202. Additionally, or alternatively, the network 204 may provide voice, SMS, and/or data services to user devices or corresponding users that are registered or subscribed to utilize the services provided by the telecommunications provider. The network 204 may include any communication network providing voice, SMS, and/or data service(s), using any one or more communication protocols, such as a 1×circuit voice, a 3G network (for example, CDMA, CDMA2000, WCDMA, GSM, UMTS), a 4G network (WiMAX, LTE, HSDPA), or a 5G network. The network 204 may also be, in whole or in part, or have characteristics of, a self-optimizing network.

The network 204 includes one or more systems that are enabled for routing information and/or enabling communication between the first UE 202 and the second UE 210. Additionally, the network 204 includes one or more systems that are enabled for communication between the network 204, the first UE 202 and the first UE account 208. In one example, the first UE account 208 is directly associated with the network 204. For example, the network 204 enables the first UE 202 to communicate by way of the network 204 because the first UE 202 is subscribed to the network 204 through the first UE account 208. The network 204 is enabled to communicate with the first UE account 208 through one or more systems and/or the database 206. The first UE account 208 enables the first UE 202 to communicate through the network 204.

In one aspect, the second UE 210 may be a second aerial drone which may include various computer components, processors, and/or memories that facilitate various operations of the aerial drone and may also include communication components that facilitate communication and coordination of the second UE 210 and the first UE 202. An exemplary second aerial drone further may include a drone propulsion system that allows the aerial drone to move to different locations. Such movement may be guided autonomously or with some degree of human input. In one example, the drone propulsion system includes four motors, each having a respective propeller that provides lift to the aerial drone when in operation. It is contemplated that many other configurations of a drone or drones may be used in different embodiments to guide or track shifting of one or multiple objects. The second UE 210 may also be any other form of autonomous or semi-autonomous vehicle which may move and or be operated to deliver a package to a destination such as the location of the first UE 202.

Relevant to the present disclosure, the first UE 202 may first initiate a request to establish a communication between the first UE 202 and the network 204. This communication may be a wireless communication using communication protocols, such as a first wireless communication protocol. The communication may also be a hardwired communication with the network 204 through a direct communication line between the first UE 202 and the network 204. The second UE 210 may first initiate a request to establish a communication between the second UE 210 and the network 204. This communication may be a wireless communication using communication protocols, such as a first wireless communication protocol. The communication may also be a hardwired communication with the network 204 through a direct communication line between the second UE 210 and the network 204. In other aspects, the network 204 may initiate a request with the second UE 210 to initiate a wireless communication. For example, the network 204 may receive a request to deliver a package using the second UE 210 which may be a drone with capacity to deliver packages. Once the network 204 receives such request, the network 204 may initiate a request to the second UE 210 to establish a wireless communication and send the request, to deliver the package, by way of the wireless communication to the second UE 210.

In one aspect, the network 204 may receive a request to deliver a package using the second UE 210 to an address associated with the first UE 202. Once such request has been received, the first UE 202 may send a general location of the first UE 202 to the network 204. Such general location may be an address, a set of GPS coordinates, a geo-fence, or any other location information. Once the network 204 receives the general location information of the first UE 202, the network 204 may send, via the network's wireless communication to the second UE 210, the general location of the first UE 202 and the request to deliver the package. Such package may be attached to a drone, inside the drone, or the drone itself. Additionally, delivery information may include a package identification, a sender information, a recipient information, mobile drone delivery pad information and any other information required so that the package may be delivered from the location of the second UE 210 to the location of the first UE 202.

In another aspect, the second UE 210 or drone may approach a vicinity of the first UE 202 with the package and request to initiate a wireless communication between the first UE 202 and the second UE 210. The network 204 facilitates the establishment of the wireless communication between the first UE 202 and the second UE 210. The wireless communication may be initiated when the second UE 210 is within a pre-determined range of the general location of the first UE 202. For example, when the drone or the second UE 210 is within a pre-specified range of the general location of the first UE 202, the drone or the second UE 210 may request that the network 204 establish a wireless communication between the first UE 202 and the second UE 210.

In an additional aspect, once the wireless communication is established between the first UE 202 and the second UE 210, an exact location of the first UE 202 relative to the second UE 210 is calculated. The drone or the second UE 210 may use acoustical or audio based signals to determine the exact location of the first UE 210. Additionally, the drone or the second UE 210 may use visual signals to determine the exact location of the first UE 210. The calculation of relative location of the first UE 202 with respect to the drone or the second UE 210 may require an active participation of the first UE 202. For example, the first UE 202 may send an audible noise such that the drone may receive it and be able to determine the position and distance of the first UE 202. Additionally, the first UE 202 may produce a visual or optical signal, such as a flashing light or some other optical signal, such that the drone may be able to determine the position and distance of the first UE 202. Other methods of calculation of relative location may be considered and used by the second UE 210 or the first UE 202.

Once the drone or the second UE 210 establishes the calculated relative location of the first UE 202, the second UE 210 will continually determine the relative location while approaching the first UE 202 such that the drone or the second UE 210 may land or deposit the package in the exact location of the first UE 202. Once the package or delivery has been deposited on a specified location, the second UE 210 or the first UE 202 may send a notification to the network 204 that the package or delivery has been received. The network 204 may then notify the user about the delivery of the package.

Figure 3:
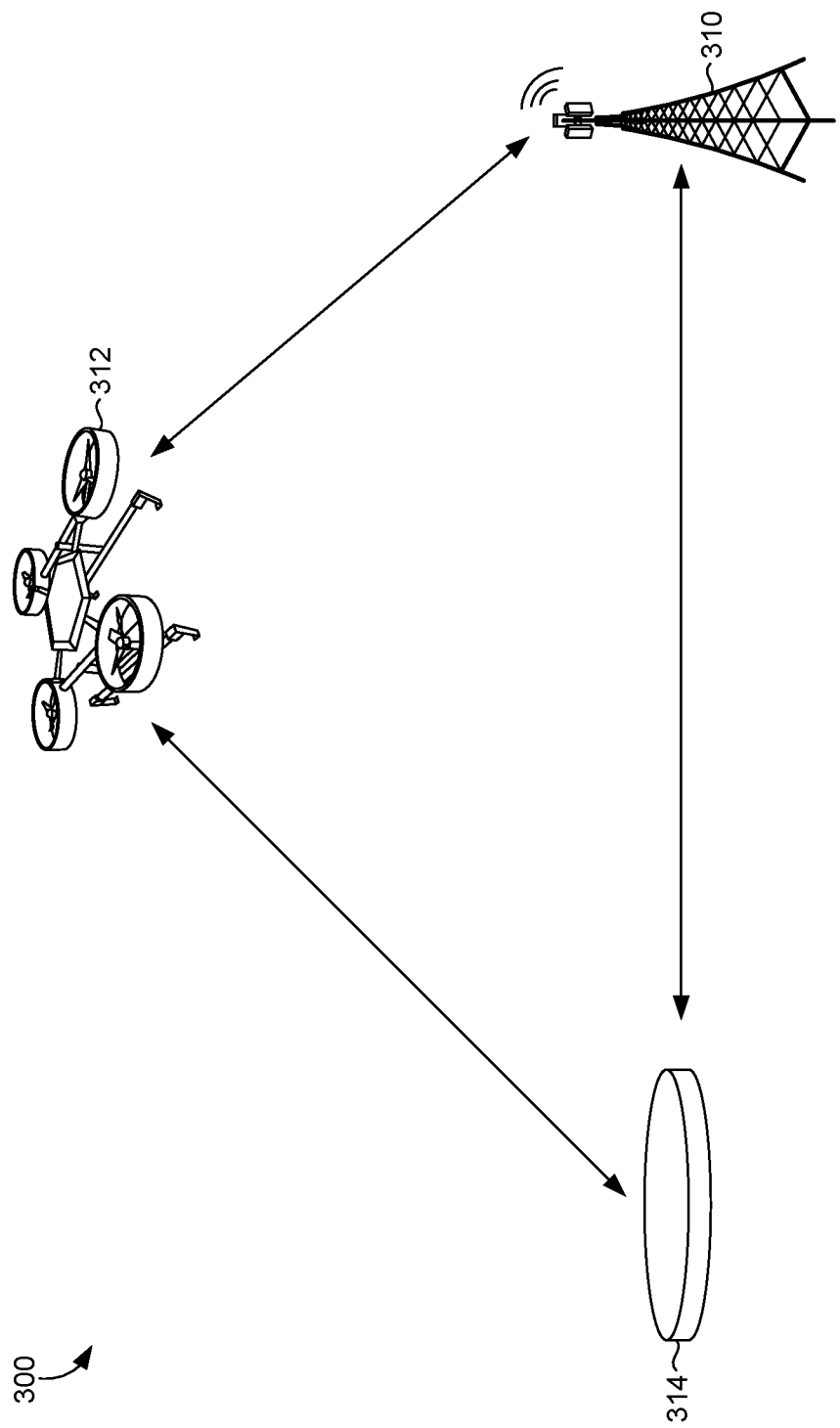
FIG. 3 depicts an exemplary wireless communications environment, in accordance with an aspect of the disclosure.

Turning now to FIG. 3, an exemplary wireless communications environment 300 is shown according to one aspect of the present disclosure. The wireless communications environment 300 may include one or more wireless communications networks, wireless base station or cell sites 310, which may correspond to the network 204, the network 102, and the base transceiver station 112 as described with respect to FIG. 1 and FIG. 2 and may exist with one or more components discussed in greater detail herein and is not meant to exhaustively show every interaction that would be necessary to practice the present disclosure, so as to not obscure the inventive concept, but is instead meant to illustrate one or more potential interactions between the components. The wireless communications environment 300 may include a mobile drone delivery device 312 which may correspond to the second UE 210 as described with respect to FIG. 2 and may exist with one or more components discussed in greater detail herein and is not meant to exhaustively show every interaction that would be necessary to practice the present disclosure, so as to not obscure the inventive concept but is instead meant to illustrate one or more potential interactions between components. Additionally, the wireless communications environment 300 may include a drone delivery pad 314 which may correspond to the first UE 202 as described with respect to FIG. 2 and may exist with one or more components discussed in greater detail herein and is not meant to exhaustively show every interaction that would be necessary to practice the present disclosure, so as to not obscure the inventive concept, but is instead meant to illustrate one or more potential interactions between the components.

In some embodiments, the drone landing pad 314 may initiate a wireless communication or wired communication with the cell site 310. The drone landing pad 314 may require a user to actively select or press a button which initiates the communication or scan a bar code, a QR code, or other activation method to initiate the communication. In other aspects, the user may have an application installed on a user device which may communicate via NFC, Bluetooth, wired, or any other wireless communication methods. Such an application may be able to request that the drone landing pad 314 initiate communications with the network 310. Additionally, such an application may be used to initiate a request to deliver the package as described above.

In some embodiments, the drone delivery device 312 may be autonomous. In embodiments where the drone delivery device 312 is autonomously controlled or operated, the aerial drone may have at least one sensor that is used to monitor the environment around the drone delivery vehicle 312 and/or guide the drone delivery vehicle 312 to avoid hazards such as, for example, power lines, trees, buildings, etc. Multiple sensors may also be employed within the autonomous drone to monitor the environment around the aerial drone or the environment around the object being shifted. For example, using the drone delivery vehicle 312 and the sensor(s) thereof, a package may be shifted and/or picked up and attached with greater knowledge of the locations of hazards in the environment (for example, obstacles, vehicles, etc.). Such monitored pick-up of the package may allow for objects to be picked-up with greater efficiency, and with less encountering of hazards. Additionally, the drone 312 may be equipped with a package handling device, such as a tether or claw system, so as to pick up the package and store the package during flight or transport. In one aspect, the package may be placed within the package handling device within the drone 312. In another aspect, the drone 312 may be able to pick-up and store the package to be delivered. Additionally, the package to be delivered may be the drone 312 itself.

The drone 312, may operate using an internal power source that must be replenished periodically. It is envisioned in some embodiments that the drone 312 may be tethered to an object to provide a continuous power source to the drone 312. In these embodiments, a cable (for example, a tether) may hang from the drone 312 and may be connected to the object. The cable may transfer power and/or communications data between the object and the drone 312. The drone 312 is adapted to communicate using an integrated communication system utilizing the network 310. Additionally, the drone 312 may be adapted to directly communicate by way of the network 310 or without the network 310 to the landing pad 314. Such communication system may include, for example, a first communication component located on the landing pad 314 or the drone 312, and a second communication component located on the other of the landing pad 314 and the drone 312. Such communication may be a wireless communication that is facilitated by one or more transmitting and receiving components, for example, antennas, and one or more radios operating in conjunction with the same.

The landing pad 314 and the drone 312 may further be adapted to coordinate movement of the drone 312 relative to the landing pad 314 as the landing pad 314 is in a position where the exact location is unknown to the drone 312. For example, using the communication components described above and any sensor and computing mechanisms used for determination of relative location, the drone 312 can control its position relative to the landing pad 314 in contemplated embodiments. For example, coordinated movement of the drone 312 may allow the drone 312 to determine a relative position, orientation, distance, and/or height relative to the landing pad 314, and land or deposit the package in or on a location specified relative to the landing pad 314. Such maintaining of position of the drone 312 and determining of the position of the drone 312 may be facilitated using feedback from one or more sensors on the landing pad 314 and/or the drone 312. In this way, the drone 312 and the landing pad 314 may effectively determine a relative position of the drone 312 with respect to the landing pad 314. These sensors may be used to facilitate the determination of location using optical signals, auditory signals, or other signals used for calculation of relative location.

In some embodiments, the landing pad 314 may be a smart pad which may contain computing components and communication components which allow the landing pad 314 to communicate wirelessly with the network 310 and/or the drone 312. The landing pad 314 may also have internal power systems, such as a battery system, which powers the computing components and the communication components. Additionally, the landing pad 314 may contain sensors and components which facilitate the calculation of relative location of the drone 312 relative to the landing pad 314.

In one embodiment, the landing pad 314 may be an autonomous vehicle which may function as a mobile landing pad and move on its own power from a first landing location to a second landing location. The autonomous vehicle may have a motorized portion and a landing pad portion placed directly on an upper portion of the motorized portion. The landing portion may be large enough to land the drone 312 and/or receive the package being delivered. In an additional aspect, the landing pad 314 may be a personal user device which may communicate its location to the network 310 and designate a position adjacent to its location as the landing site for the drone 312 and/or the package to be delivered.

Additionally, the landing pad 314 may contain portions which allow the drone 312 to deliver the package in a secure fashion. This may be a lock box, a secure tether, or other secure portion which permits the drone to place the package on the landing pad 314 and secure it such that the package may not be stolen. In an additional aspect, the landing pad 314 may have sensors, such as gyroscopes or telematics sensors, which may detect unauthorized movement of the landing pad 314. For example, if an unauthorized user picks up the landing pad 314, a sensor may detect the movement and initiate a communication to the network 310 alerting the user that the landing pad 314 has been moved. The landing pad 314 may also include GPS tracking components which permit the landing pad 314 to communicate the general location of the landing pad 314 to the drone 312 via the network 310.

In embodiments, the landing pad 314 is placed in a location where the user desires the package to be delivered. The user may then activate the landing pad 314 which may then initiate a wireless communication with the network 310. The landing pad 314 may additionally be moved autonomously from the first location to a location that the user desires the package to be delivered. For example, if a user lives in an apartment building with balconies, the user may place the landing pad 314 on the balcony such that the drone 312 may be able to deliver the package.

Both the drone 312 and the landing pad 314 may contain functionalities and components which facilitate the calcilation of the relative location of the landing pad 314 with respect to the drone 312. The methods for calculation of relative location may utilize optical sensors and optical signals to calculate position and distance of the landing pad 314. Additionally, the determination of the relative location may utilize RFID signals and sensors, auditory signals and sensors, thermal signals and sensors, and any other method of calculation of relative location.

Figure 4:
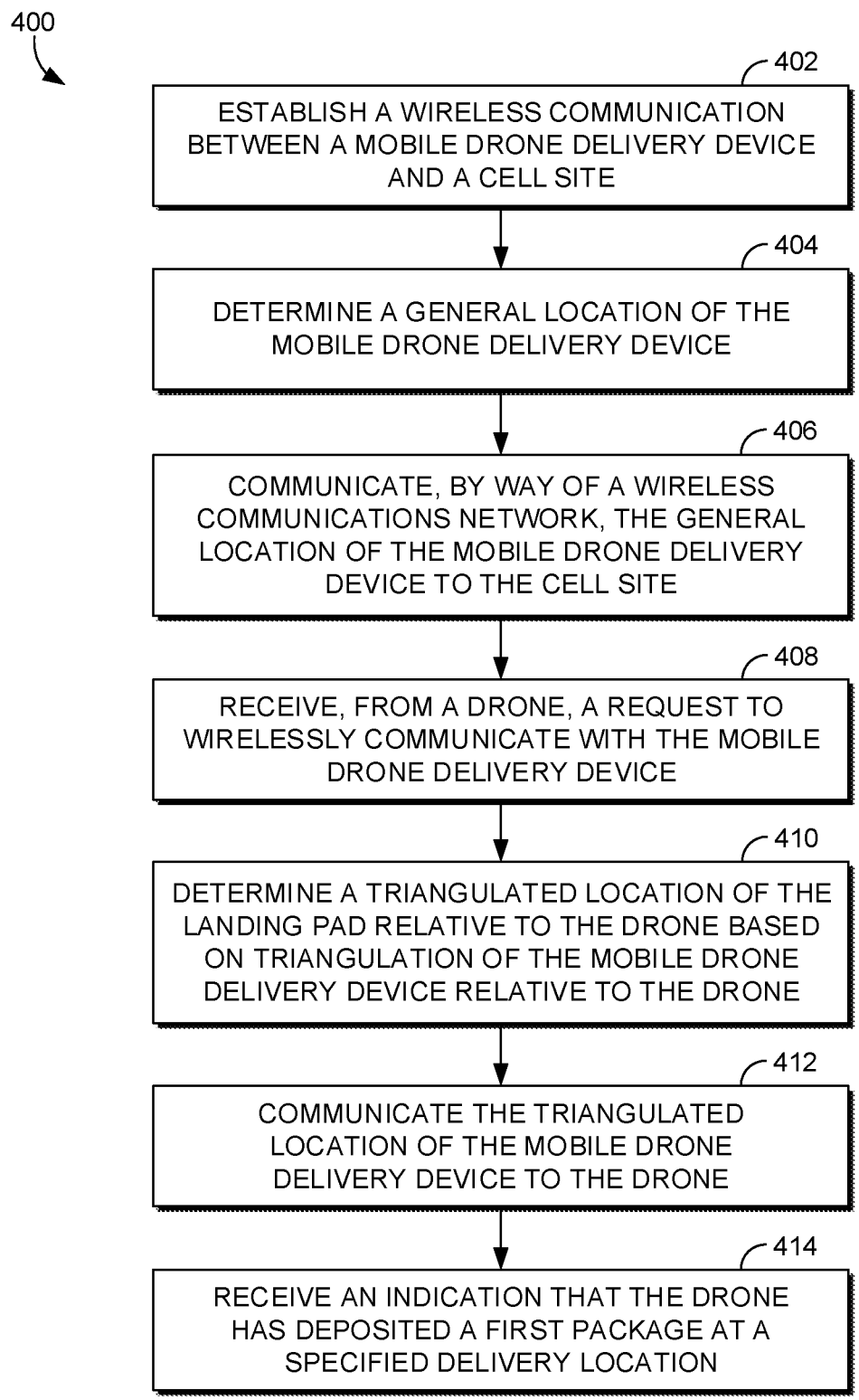
FIG. 4 depicts a flowchart of an exemplary method, in accordance with an aspect of the present disclosure.

Referring now to FIG. 4, a flowchart of an exemplary method 400 is illustrated for providing a mobile drone landing pad or mobile drone delivery device as described above, according to one aspect of the present disclosure. The method 400 is described in conjunction with FIG. 1 to FIG. 3. Initially, at block 402, the method 400 includes establishing a wireless communication between a mobile drone delivery device and a first cell site. At block 404, the method 400 includes determining a general location of the mobile drone delivery device. At block 404, the method 400 includes determining a general location of the mobile drone delivery device. At block 406, the method 400 includes communicating, by way of a wireless communications network, the general location of the mobile drone delivery device to the first cell site. At block 408, the method 400 includes receiving, from a drone, a request to wirelessly communicate with the mobile drone delivery device. At block 410, the method 400 includes calculating relative location and distance of a landing pad relative to the drone. At block 412, the method 400 includes communicating the calculated relative location of the mobile drone delivery device to the drone. At block 412, the method 400 includes receiving an indication that the drone has deposited a first package at a specified delivery location.

Figure 5:
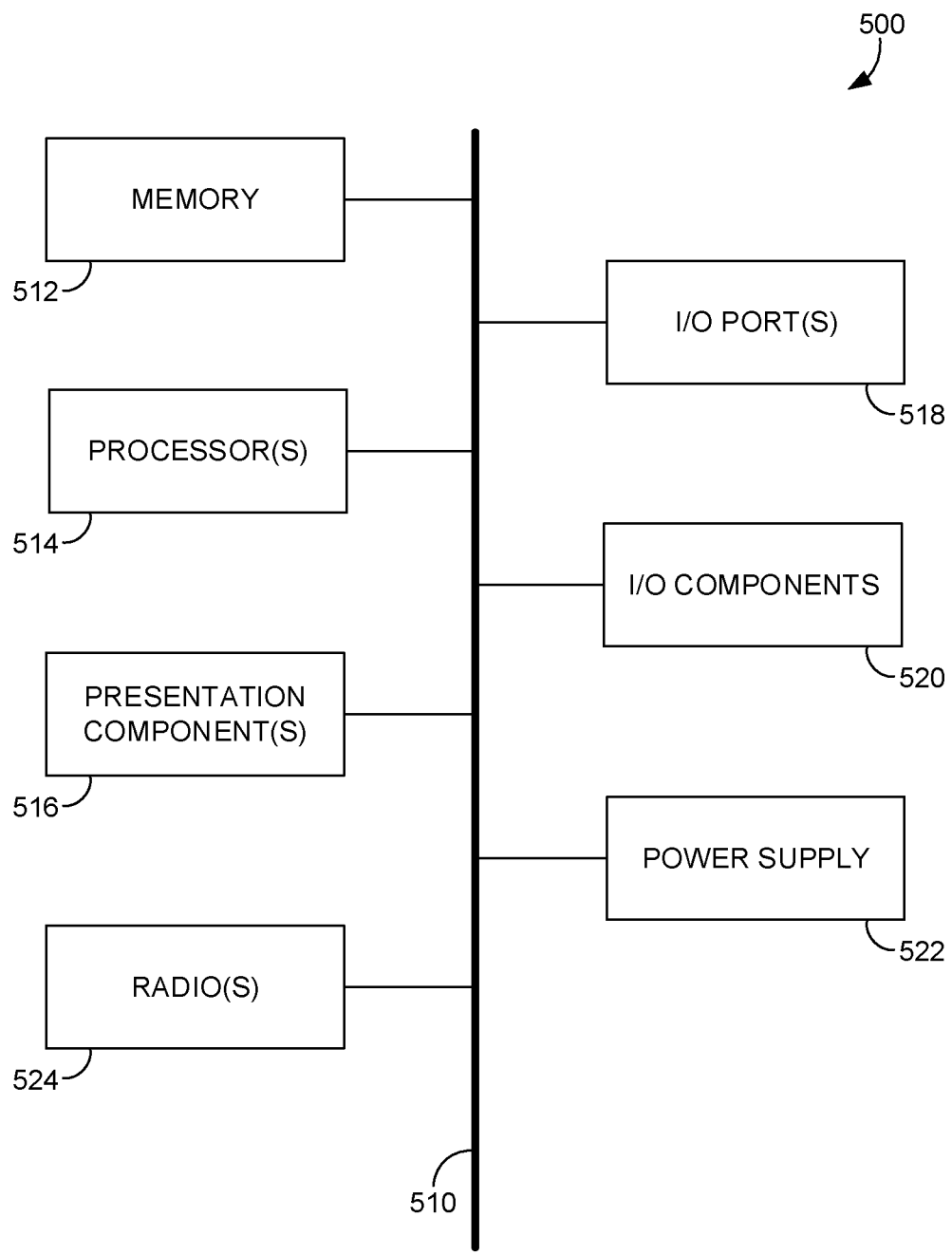
FIG. 5 depicts an exemplary computing device suitable for use in implementations of aspects of the present disclosure.

Referring now to FIG. 5, an exemplary computing environment suitable for use in implementations of the present disclosure, is illustrated. In particular, the computer environment is shown and designated generally as a computing device 500. The computing device 500 is but one example of a suitable computing environment and is not intended to suggest any limitation as to the scope of use or functionality described in the present disclosure. Neither should the computing device 500 be interpreted as having any dependency or requirement relating to any one or combination of components illustrated in FIG. 5.

The implementations of the present disclosure may be described in the general context of a computer code or machine-useable instructions, including computer-executable instructions, such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, and the like. Implementations of the present disclosure may also be practiced in distributed computing environments where tasks are performed by remote-processing devices that are linked through a communications network.

With continued reference to FIG. 5, the computing device 500 includes a bus 510 that directly or indirectly couples the following devices: a memory 512, one or more processor(s) 514, one or more presentation component(s) 516, input/output (I/O) port(s) 518, I/O components 520, a power supply 522, and radio(s) 524. The bus 510 may include one or more busses (such as an address bus, a data bus, or a combination thereof). Although the devices in FIG. 5 are shown with lines for the sake of clarity, in reality, delineating various components is not so clear and, metaphorically, the lines would more accurately be grey and fuzzy. For example, one may consider a presentation component, such as a display device, to be one of the I/O components 520. Also, processors, such as the one or more processor(s) 514, may have the memory 512. The present disclosure herein recognizes that such is the nature of the art and reiterates that FIG. 5 is merely illustrative of an exemplary computing environment that may be used in connection with one or more implementations of the present disclosure. Distinction is not made between such categories as "a workstation," "a server," "a laptop," "a handheld device," etc., as all are contemplated within the scope of FIG. 5 and are referred to as "a computer" or "a computing device."

The computing device 500 typically includes a variety of computer-readable media. The computer-readable media may be any available media that may be accessed by the computing device 500 and includes both volatile and non-volatile media, removable and non-removable media. By way of a non-limiting example, the computer-readable media may include computer storage media and communication media. The computer storage media includes both volatile and nonvolatile, removable, and non-removable media implemented in any method or technology for storage of information, such as computer-readable instructions, data structures, program modules, or other data.

The memory 512 includes computer-storage media in the form of volatile and/or nonvolatile memory. The memory 512 may be removable, non-removable, or a combination thereof. In some examples, the memory 512 includes a solid-state memory, hard drives, optical-disc drives, etc. The computing device 500 includes the one or more processors 514 that read data from various entities, such as the bus 510, the memory 512, or the I/O components 520. The one or more presentation component(s) 516 presents data indications to a person or other device. In an example, the one or more presentation component(s) 516 include a display device, a speaker, a printing component, a vibrating component, etc. The I/O port(s) 518 allow the computing device 500 to be logically coupled to other devices, including the I/O components 520, some of which may be built in the computing device 500. The I/O components 520 include a microphone, a joystick, a game pad, a satellite dish, a scanner, a printer, a wireless device, etc.

The radio(s) 524 of the computing device 500 represents a radio that facilitates communication with a wireless telecommunications network. In an example, wireless telecommunications technologies include, but are not limited to, code-division multiple access (CDMA), general packet radio service (GPRS), time-division multiple access (TDMA), global system for mobile communication (GSM), and the like. The radio(s) 524 may additionally or alternatively facilitate other types of wireless communications including wireless fidelity (Wi-Fi), worldwide interoperability for microwave access (WiMAX), long-term evolution (LTE), or other voice over internet protocol (VoIP) communications. As may be appreciated, in various embodiments, the radio(s) 524 may be configured to support multiple technologies and/or multiple radios may be utilized to support multiple technologies. The wireless telecommunications network may include an array of devices, which are not shown so as to not obscure more relevant aspects of the present disclosure. Components, such as the base transceiver station 112, a communications tower, or access points (as well as other components), may provide wireless connectivity in some embodiments.

Many different arrangements of the various components depicted, as well as components not shown, are possible without departing from the scope of the claims below. Embodiments of the present disclosure have been described with an intent to be illustrative rather than be restrictive. Alternative embodiments will become apparent to readers of the present disclosure. Alternative means of implementing the aforementioned aspects may be completed without departing from the scope of the claims below. Certain features and sub-combinations of aspects of the present disclosure are of utility and may be employed without reference to other features and sub-combinations and are contemplated within the scope of the claims.

What is claimed is:

1. One or more non-transitory computer-readable media having computer-executable instructions embodied thereon that, when executed by one or more processors, perform a method comprising:

establishing a wireless communication between a mobile drone delivery device and a wireless communications network by way of a wireless base station;

in response to establishing the wireless communication, causing the mobile drone delivery device to autonomously move from a first location to a second location;

determining, via one or more global positioning system (GPS) devices, the second location of the mobile drone delivery device, wherein the one or more GPS devices define the second location based on a set of GPS coordinates associated with the mobile drone delivery device;

sending, to a drone, from the mobile drone delivery device, by way of the wireless communications network, the second location of the mobile drone delivery device and a request to deliver a package at a specified delivery location;

determining that the drone has arrived at a vicinity of the mobile drone delivery device based on the drone delivery device receiving from the drone, by way of the wireless communications network, a request to wirelessly communicate with the mobile drone delivery device;

establishing a direct wireless communication between the drone and the mobile drone delivery device;

receiving, by one or more sensors associated with the mobile drone delivery device, feedback from one or more sensors associated with the drone;

calculating a relative location of the drone using the feedback received from the one or more sensors associated with the drone;

communicating to the drone the calculated relative location of the drone relative to the mobile drone delivery device;

determining that the drone has deposited the package and causing the package to be secured to the mobile drone delivery device, wherein the mobile drone delivery device comprises one or more sensors to detect unauthorized movement of the mobile drone delivery device; and communicating, by way of the wireless communications network, an indication that the drone has deposited the package at the second location.

2. The media of claim 1, wherein the drone delivery device is a drone delivery pad.

3. The media of claim 1, wherein the drone delivery device is a mobile device which indicates that the drone should land and deposit the package at a first location next to the drone delivery device.

4. The media of claim 1, wherein the establishing the wireless communication between the mobile drone delivery device and the base station is initiated by a user making a selection on the drone delivery device.

5. The media of claim 1, wherein the second location of the mobile drone delivery device is determined using a global positioning system associated with the mobile drone delivery device.

6. The media of claim 1, wherein the wireless communication network sends a request to deliver the package to the drone.

7. The media of claim 6, wherein the request to deliver the package is initiated by a user of the mobile drone delivery device.

8. A method for using a mobile drone delivery device, the method comprising:

establishing a wireless communication between a mobile drone delivery vehicle and a wireless communications network by way of a wireless base station;

in response to establishing the wireless communication, causing the mobile drone delivery device to autonomously move from a first location to a second location determining, via one or more global positioning system (GPS) devices, the second location of the mobile drone delivery device, wherein the one or more GPS devices defined the second location based on a set of GPS coordinates associated with the mobile drone delivery device;

receiving from the mobile drone delivery device by way of the wireless communications network, the second location of the mobile drone delivery device and a request to deliver a package at the second location of the mobile drone device;

receiving from the mobile drone delivery device, by way of the wireless communications network, the second location of the mobile drone delivery device and a request to deliver a package at the second location of the mobile drone device;

determining that a drone has arrived at a vicinity of the mobile drone delivery device based on the drone delivery device receiving from the drone, by way of the wireless communications network, a request to wirelessly communicate with the mobile drone delivery device, wherein a direct wireless communication is established between the drone and the mobile drone delivery device;

receiving, by the one or more sensors associated with the mobile drone delivery device, feedback from one or more sensors associated with the drone;

calculating a relative location of the drone using the feedback received from the one or more sensors associated with the drone;

communicating to the drone that calculated relative location of the drone relative to the mobile drone delivery device;

determining that the drone has deposited the package and causing the package to be secured to the mobile drone delivery device, wherein the mobile drone delivery device comprises one or more sensors to detect unauthorized movement of the mobile drone delivery device;

receiving, by way of the wireless communications network, an indication that the drone has deposited the package at the second location.

9. The method of claim 8, wherein the drone delivery device is a drone delivery pad.

10. The method of claim 8, wherein the drone deliver device is a mobile device which indicates that the drone should land and deposit the first package at a first location next to the drone delivery device.

11. The method of claim 8, wherein the establishing the wireless communication between the mobile drone delivery device and the base station is initiated by a user selecting a button on the drone delivery device.

12. The method of claim 8, wherein the second location of the mobile drone delivery device is determined using a global positioning system associated with the mobile drone delivery device.

13. The method of claim 8, wherein the wireless communication network sends a request to deliver the package to the drone.

14. The method of claim 13, wherein the request to deliver the is initiated by a user of the mobile drone delivery device.

15. A system for using a mobile drone delivery device, the system comprising one or more processors which perform a computer implemented method comprising:

establishing a wireless communication between a mobile drone delivery vehicle and a wireless communications network by way of a wireless base station;

in response to establishing the wireless communication, causing the mobile drone delivery device to autonomously move from a first location to a second location determining, via one or more global positioning system (GPS) devices, the second location of the mobile drone delivery device, wherein the one or more GPS devices defined the second location based on a set of GPS coordinates associated with the mobile drone delivery device;

receiving from the mobile drone delivery device, by way of the wireless communications network, the second location of the mobile drone delivery device and a request to deliver a package at the second location of the mobile drone device;

determining that a drone has arrived at a vicinity of the mobile drone delivery device based on the drone delivery device receiving from the drone, by way of the wireless communications network, a request to wirelessly communicate with the mobile drone delivery device, wherein a direct wireless communication is established between the drone and the mobile drone delivery device;

receiving, by one or more sensors associated with the mobile drone delivery device, feedback from one or more sensors associated with the drone;

calculating a relative location of the drone using the feedback received from the one or more sensors associated with the drone;

communicating to the drone the calculated relative location of the drone relative to the mobile drone delivery device;

determining that the drone has deposited the package and causing the package to be secured to the mobile drone delivery device, wherein the mobile drone delivery device comprises one or more sensors to detect unauthorized movement of the mobile drone delivery device; and receiving, by way of the wireless communications network, an indication that the drone has deposited a package at the second location.

16. The method of claim 15, wherein the drone delivery device is a drone delivery pad.

17. The method of claim 15, wherein the drone deliver device is a mobile device which indicates that the drone should land and deposit the package at a first location next to the drone delivery device.

18. The method of claim 15, wherein the establishing the wireless communication between the mobile drone delivery device and the base station is initiated by a user selecting a button on the drone delivery device.

19. The method of claim 15, wherein the second location of the mobile drone delivery device is determined using a global positioning system associated with the mobile drone delivery device.

20. The method of claim 15, wherein the wireless communication network sends a request to deliver the package to the drone.

* * * * *

UNITED STATES PATENT AND TRADEMARK OFFICE
CERTIFICATE OF CORRECTION

| | | |
|---|---|---|
| PATENT NO. | : 12,248,903 B2 | Page 1 of 1 |
| APPLICATION NO. | : 17/884841 | |
| DATED | : March 11, 2025 | |
| INVENTOR(S) | : Syam Sarasamma Kunjukrishnan | |

It is certified that error appears in the above-identified patent and that said Letters Patent is hereby corrected as shown below:

In the Claims

Column 18, Claim 10, Line No. 14, delete "the first package" and insert --the package--.

Signed and Sealed this
Tenth Day of June, 2025

Coke Morgan Stewart
*Acting Director of the United States Patent and Trademark Office*